United States Patent Office 3,542,502
Patented Nov. 24, 1970

3,542,502
MODIFIED POLYOLEFINS
Giuliana C. Tesoro, Dobbs Ferry, N.Y., assignor to J. P. Stevens & Co., Inc., New York, N.Y., a corporation of Delaware
No Drawing. Filed June 22, 1965, Ser. No. 471,496
Int. Cl. D06
U.S. Cl. 8—115.5          19 Claims The present invention relates to a method for modifying polyolefins, and relates more particularly to a method of modifying polyolefin fibers and materials comprising such fibers to impart improved dye-receptivity. The invention further relates to polyolefin fibers and materials comprising such fibers which are modified in accordance with the method of this invention.

Polyolefin fibers and textile products have many desirable properties, including excellent strength, resistance to abrasion and resistance to attack by chemical agents. However, the chemical inertness of the polyolefin molecule makes it very difficult to dye by conventional dyeing methods, there being an absence of sites where the applied dye can become attached. This shortcoming of polyolefin fibers has severely limited their usefulness. Many processes have been suggested for overcoming this disadvantage, but all known methods have certain limitations.

One prior art process for improving the dyeability of polyolefin involves addition of coloring matter to the polymer melt prior to spinning the polymer into fibers. Although the color imparted by this process is permanent, the method suffers from the practical disadvantage of requiring a considerable inventory of dyed fibers. The usual flexibility normally found in textile fabrication, of having yarn or fabric which can be dyed to the customer's order, is thus lost.

It is also possible to add a comonomer, which has good dye-receptivity, to the olefin monomer prior to the polymerization step leading to the formation of the polyolefin. The polymer produced in such method is then a copolymer of the dye-receptive monomer and the olefin monomer. Such a copolymer may then be dyed in a manner which takes advantage of the dye sites of the comonomer. Although this method yields dyeable fibers, the copolymer generally does not have the same physical and chemical characteristics as the pure polyolefin polymer, and the differences in these characteristics may be disadvantageous for the intended use.

Accordingly, it is an object of the present invention to provide a method of modifying polyolefins to impart improved dye-receptivity.

It is a further object of the present invention to provide a method for introducing dye-receptive sites into polyolefins which provide good dyeability without substantially affecting the physical characteristics of the polyolefin polymer.

It is another object of the present invention to provide a method for modifying polyolefins which facilitates the introduction therein of dye-receptive sites.

An additional object of the present invention is the production of polyolefins, in all physical forms, including fibers, which have improved dye-receptivity.

Briefly stated, one embodiment of the present invention is a method of treating a material comprising polyolefin fibers comprising the steps of introducing a monomer into the said polyolefin fibers and subjecting said material to polymerizing conditions to form polymers within said fibers, said polymer comprising repeating groups formed from said monomer.

It has been discovered that the dye-receptivity of polyolefins can be substantially improved by the introduction therein of a polymerizable monomer having dye-receptive sites, followed by insolubilization of the monomer within the polyolefin by polymerization, or by co-polymerization with a second monomer. In this manner, the dye-receptive sites are permanently locked into the polyolefin without substantial alteration of its physical and chemical properties.

A wide variation in the selection of dye-receptive monomers is afforded by the present invention. There are correspondingly several different techniques whereby the dye-receptive monomers may be polymerized in situ.

Exemplary of one class of monomers suitable for use in the present invention is a di-tertiary amine having the following formula:

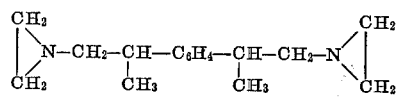

The bis-aziridine compound of Formula 1 is introduced into a polyolefin and polymerized in situ in the following manner, for example. The polyolefin, such as polypropylene fibers, is first treated to introduce a proton donor type of catalyst. Desirably, a swelling agent is utilized in order to permit the catalyst to reach the interior portions of the fibers. Thus, one form of treatment involves subjecting the polypropylene fibers to a solution of sulfuric acid in a solvent such as acetone. Following this treatment, the fibers are dried.

The bis-aziridine compound of Formula 1 is then introduced into the polypropylene fiber by using a solution of the monomer in a swelling agent. The impregnated fibers are then heated to an elevated temperature for a designated period of time to provide a polymerization reaction in which the bis-aziridine compound form an insolubilized cross-linked polymer by the following reaction mechanism:

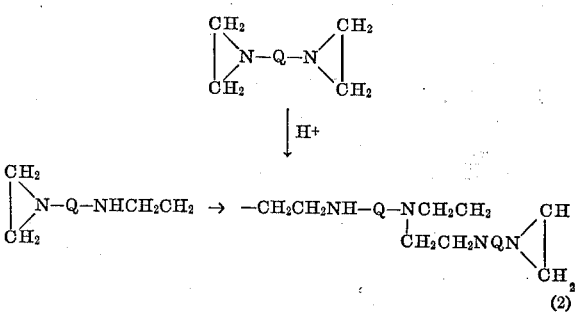

Following the polymerization step, the fibers are washed thoroughly to remove any polymer which may be formed on the surface.

The bis-aziridine of Formula 1 is typical of those compounds coming within a generic class which may be represented by the following formula:

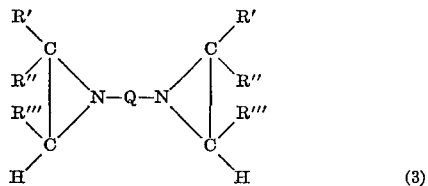

in which R', R" and R''' are selected from the group consisting of hydrogen and lower alkyl groups comprising from about 1 to 4 carbon atoms, and Q is a divalent organic radical.

Instead of successively introducing the catalyst and monomer, they may be introduced simultaneously from a single solution formed of a solvent in which both are soluble and which also serves to swell the polyolefin material being modified. This is somewhat less advantageous than introducing the catalyst separately since there is greater chance for polymer formation other than within the polyolefin itself, such as, for example, on the surface or in the solution.

Another possibility involves application of the monomer first, followed by application of the catalyst. The selection of the particular method depends in large measure on the characteristics of the monomer. With certain types of monomers, it may not be possible to use one method, whereas another method may give excellent results.

A second class of monomers suitable for use in the present invention are mono-tertiary amines having the following generic formula:

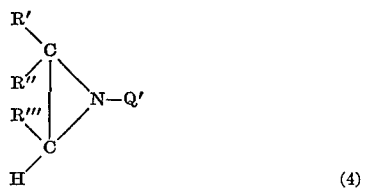

in which R', R" and R''' are selected from the group consisting of hydrogen and lower alkyl groups, and Q' is a monovalent organic radical. Typical of this class is the following compound:

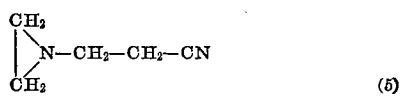

The mono-aziridine compounds represented by generic Formula 4 polymerize to form linear polymers. Set forth below is a typical polymerization reaction mechanism using the compound of Formula 5:

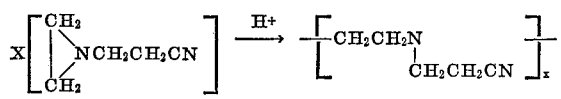

To insure insolubilization of compounds such as the mono-aziridines in which a linear polymer is formed, it is necessary to polymerize to a sufficiently high molecular weight. However, one expedient for assuring the insolubility of such monomers within the polyolefin material involves copolymerization with a second monomer chosen to impart cross-linking. For example, the combination of mono- and bis-aziridine monomers has been found to afford excellent results. Insolubilization can be obtained by employing as little as 10 mole percent of the bis-aziridine in a mixture of mono- and bis-aziridines.

It has been determined that pretreatment of polyolefins may also be used to assure the formation of insoluble polymers within the polyolefin structure. Such pretreatment involves the introduction of radicals into the interior of the polyolefin to serve as reaction catalysts for amino-radical containing monomers which are subsequently polymerized in situ. Thus, for example, the polyolefin may be modified by introducing halogen, sulfonyl or phosphonyl substituents which act as polymerization initiators. It is believed that the substituents also provide sites at which the polymers subsequently formed may become linked with the polyolefin. The introduction of the substituents can be accomplished for example, by reactions such as direct halogenation or sulfochlorination, or by halomethylation of polyolefin-polystyrene blends or polyolefin copolymers.

Set forth below are examples which illustrate this aspect of the invention.

EXAMPLE 1

A fabric knitted from 100% polypropylene filament yarn was treated by padding with a 1% solution of sulfuric acid in acetone and dried. The fabric was then padded with a 5% solution in acetone of a bis-aziridine of the structure:

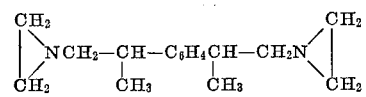

(m. wt. 242; percent N 11.6) and heated for 25 minutes at 200° F. It was washed thoroughly in detergent solution, rinsed with water and acetone and dried. The treated fabric was analyzed and was found to contain 1.03% nitrogen.

It was dyed a deep shade with Kiton Fast Blue 4G (Color Index No. 61125) by a procedure conventionally used for dyeing with acid dyestuffs.

EXAMPLE 2

Samples of fabric knitted from 100% polypropylene filament yarn were treated with 1% solutions of various organic acid catalysts in acetone, dried, then treated with a 5% $CCl_4$ solution of the bis-aziridine employed in Example 1. The samples were dried, then heated at 200° F. for a specified time, and washed thoroughly. The specific catalyst used and the curing times are set forth below:

| Sample No. | Acid catalyst | Time of curing, min. |
|---|---|---|
| Untreated control | | |
| 1 | Chloroacetic acid | 5 |
| 2 | do | 25 |
| 3 | do | 50 |
| 4 | do | [1] 25 |
| 5 | Oxalic acid | 5 |
| 6 | do | 25 |
| 7 | do | 50 |
| 8 | do | [1] 25 |
| 9 | Thio dipropionic acid | 5 |
| 10 | do | 25 |
| 11 | do | 50 |
| 12 | do | [1] 25 |

[1] Fabric soaked in monomer solution for 30 minutes prior to padding.

The samples were then dyed with the following acid dyestuffs:

Color Index name              Color Index No.
    Acid Yellow 54 _____ 19010
    Acid Yellow 44 _____ 23900
    Acid Orange 86 _____ _____
    Acid Blue 51 _____ _____
Dyestuff name
    Permalan Navy Blue RSA (acid metallized)
    Capracyl Red G—Acid Red 211 (neutral metallized)
    Capracyl Violet BD (neutral metallized)

All of the dyes, except Acid Blue 51, Permalan Navy Blue RSA and Capracyl Red G showed good to excellent dyeability in a neutral dye bath. The other dyestuffs showed dyeability after addition of $H_2SO_4$ to the dye bath. The control showed virtually no dyeability.

EXAMPLE 3

Samples of woven 100% polypropylene fabric, knitted 100% polypropylene fabric, and 100% cotton fabric were treated with a 1% acetone solution of $H_2SO_4$ by padding and dried. The samples were then treated with a 5% solution of the bis-aziridine monomer of Example 1 by padding, dried and heated for 25 minutes at 200° F. After thorough washing, the samples were dyed with the following dyestuffs:

| Color Index name | Color Index No. |
|---|---|
| Acid Yellow 23 | 19140 |
| Acid Red 106 | 18110 |
| Acid Blue 23 | 61125 |
| Acid Yellow 63 | 13095 |
| Acid Violet 54 | |
| Acid Blue 43 | 63000 |
| Acid Blue 78 | 62105 |
| Acid Red 182 | |

The polypropylene fabrics dyed to bright deep shades and gave only slightly less shade depth than the cotton fabric sample.

EXAMPLE 4

Samples knitted from 100% polypropylene filament yarn were prepared by padding with a 1% solution of $H_2SO_4$ in acetone and drying. They were then treated with $CCl_4$ solutions containing varying concentrations of the bis-aziridine monomer of Example 1, dried, cured for 30 minutes at 200° F., and washed.

The samples were dyed using the following dyestuffs:

| Dyestuff name | Color Index name |
|---|---|
| Pharmatex Red G | Acid Red 162. |
| Pharmacine Blue G | Acid Blue 33. |
| Levanol Yellow 6G | Acid Yellow 44. |

The results were as follows:

| Sample No. | Percent monomer in solution | Dyeability |
|---|---|---|
| 1 | 0.5 | Fair. |
| 2 | 1.0 | Do. |
| 3 | 2.0 | Good. |
| 4 | 4.0 | Very good. |
| 5 | 6.0 | Do. |
| 6 | 8.0 | Excellent. |

EXAMPLE 5

Samples of polypropylene staple fiber were immersed in solvent solutions containing 3% of the monomer used in Example 1 and 1% of an acid catalyst. The solvent and acid catalyst employed were varied as indicated in the table below. The fiber samples were filtered, air dried, sewn in bags, and tumbled in a home dryer at 140° F. for one hour. The samples were then thoroughly washed with solvent and with detergent solution, dried and analyzed for nitrogen content. Dyeability was evaluated by converting the treated fiber to yarn, knitting the yarn into a fabric structure, and dyeing with the following dyestuffs:

| Dyestuff name | Color Index name |
|---|---|
| Levanol Yellow 6G | Acid Yellow 44. |
| Pharmatex Red G | Acid Red 109. |
| Pharmacine Blue G | Acid Blue 33. |
| Levanol Yellow RX | Acid Yellow 42. |
| Polar Red 3B | Acid Red 134. |
| Anthraquinone Blue A2G | Acid Blue 40. |
| Acid Black 10BN conc. | Acid Black 1. |

The following results were obtained:

| Sample No. | Solvent | Catalyst | Percent N | Dyeability |
|---|---|---|---|---|
| 1 | $CCl_4$ | Benzoic acid | 0.9 | Very good. |
| 2¹ | $CCl_4$ | do | 1.4 | Do. |
| 3 | $CCl_4$ | $H_2SO_4$ | 1.06 | Moderate. |
| 4 | Acetone | Mercaptoacetic acid | 1.4 | Do. |
| 5 | do | Thiophenol | | Excellent. |
| Control | | | 0 | Nil. |

¹ Sample cured by tumbling for two hours.

In all cases, the knitted fabric made from treated fibers dyed evenly in bright shades.

EXAMPLE 6

Example 5 was repeated, varying the fiber/solution ratio and the standing time of the monomer solution before use as shown in the table below. The following results were obtained:

| Sample No. | Solvent | Catalyst | Fiber to solution ratio (wt.) | Percent N | Weight of fiber treated (grams) |
|---|---|---|---|---|---|
| 1 | Acetone | Thiophenol | 1/25 | 0.48 | 100 |
| 2 | Acetone¹ | do | 1/25 | | 65 |
| 3 | $CCl_4$ | Benzoic acid | 1/50 | 0.93 | 100 |
| 4 | $CCl_4$² | do | 1/50 | 0.93 | 70 |
| 5 | Methylethyl ketone | Thiophenol | 1/5 | 1.10 | 10 |
| 6 | Methylethyl ketone | do | 1/10 | 0.85 | 10 |
| 7 | Methylethyl ketone | do | 1/30 | | 10 |
| 8 | Methylethyl ketone | do | 1/50 | 0.75 | 10 |
| 9 | Methylethyl ketone³ | do | 1/30 | 0.80 | 10 |

¹ Solution aged 73 hours.
² Solution aged 72 hours.
³ Solution aged 24 hours.

The treated fiber samples were converted to yarn. This was knitted into fabric and the fabric samples so obtained were evaluated for dyeability using the following representative types of acid, direct, fiber reactive, neutral metallized and acid metallized dyes:

| Dyestuff name | Color Index name |
|---|---|
| Levanol Yellow 6G | Acid Yellow 44. |
| Polar Red 3B | Acid Red 134. |
| Athraquinone Blue A2G | Acid Blue 40. |
| Belamine Fast Red 3BL | Direct Red 83. |
| Chlorantine Fast Blue BLL | Direct Blue 98. |
| Ponsol Jade Green Supra Double Powder | Vat Green 1. |
| Procion Brill, Blue RS | Reactive Blue 4. |
| Procion Brill, Yellow 6GS | Reactive Yellow 1. |
| Capracyl Red B | Acid Red 182 (neutral metallized). |
| Capracyl Blue G | Acid Blue 165 (neutral metallized). |
| Palatine Fast Orange R | Acid Orange 76 (neutral metallized). |

The results with acid and direct dyes were as follows:

| Sample No.: | Dyeability results |
|---|---|
| 1 | Excellent. |
| 2 | Fair. |
| 3 | Poor. |
| 4 | Poor. |

The direct dyestuffs showed the highest degree of fastness. The fiber reactive dyes were equal to the direct dyestuffs in wash and dry cleaning fastness, but showed poor light fastness.

EXAMPLE 7

Sample of polypropylene staple fiber were treated with solvent solution (3%) of aziridine monomers of various structures. The monomer solution contained an acidic catalyst (1%) except in cases where $H_2SO_4$ was used, in which instance the fiber sample was pretreated with the catalyst in a separate step. After immersing the fiber in the monomer/catalyst solvent solution at room temperature, the samples were filtered, tumble cured at 200° F., and washed to remove surface polymer. They were then spun into yarn and knitted for dyeing evaluation. The dyestuffs used were as follows:

| Dyestuff name: | Color Index name |
| --- | --- |
| Chlorantine Fast Blue BLL | Direct Blue 98. |
| Direct Fast Yellow 5GL | Direct Yellow 26. |
| Belamine Fast Scarlet 4BH | Direct Red 24. |
| Belamine Fast Red 3BL | Direct Red 83. |
| Polar Red 3B | Acid Red 134. |
| Pharmatex Red G | Acid Red 162. |
| Capracyl Blue G | Acid Blue 165 (neutral metallized). |
| Palantine Fast Orange R | Acid Orange 76 (acid metallized). |
| Celanthrene Violet BGF | Disperse Blue 8. |

The variables and results of the experiments are summarized in the table below:

(6) 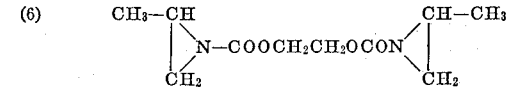

Samples treated with monomers (1), (5) and (6) also exhibited excellent dyeability with acid, neutral metallized and acid metallized type dyestuffs and good fastness properties.

Optimum catalysts were generally found to be those which do not induce immediate polymerization at room temperature, in dilute solution, but require evaporation of the solvent and/or elevated temperature.

EXAMPLE 8

Samples of polypropylene staple fiber and samples of fabric knitted from polypropylene staple yarn were treated with carbon tetrachloride solutions containing varying concentrations of the bis-aziridine monomer used in Example 1 and of diethylsulfate (DES) as catalyst, in the manner described in the previous examples. The effect of increasing monomer concentration on the percent N and on the dyeability of the modified fibers was determined. The dyestuffs used were as follows:

| Dyestuff name | Color Index name |
| --- | --- |
| Belamine Fast Red 3BL | Direct Red 83. |
| Levanol Yellow 6G | Acid Yellow 44. |

The results of this experiment are given in the table below where the "A" samples represent treatments carried out on fiber (20 to 1 solution-to-fiber weight ratio)

| Sample No. | Aziridine* monomer | Catalyst | Solvent | Fiber to solution ratio | Percent N | Dyeability direct dyes |
| --- | --- | --- | --- | --- | --- | --- |
| 1 | (1) | Benzoic acid | Aqueous dioxane. | 1/50 | 1.82 | Poor. |
| 2 | (1) | Thiophenol | $CCl_4$ | 1/30 | 0.49 | Excellent. |
| 3 | (2) | Diethylsulfate | Acetone | 1/20 | 0.79 | Poor. |
| 4 | (3) | do | do | 1/20 | 0.80 | Do. |
| 5 | (4) | $H_2SO_4$ | $CCl_4$ | 1/35 | 1.83 | Fair. |
| 6 | (4) | Thiophenol | $CCl_4$ | 1/35 | 2.57 | Do. |
| 7 | (4) | Benzoic acid | $CCl_4$ | 1/35 | 2.48 | Do. |
| 8 | (5) | Thiophenol | MEK | 1/20 | 0.78 | Excellent. |
| 9 | (5) | do | MEK | 1/20 | 0.70 | Do. |
| 10 | (1) + (6) | None | $CCl_4$ | 1/50 | 1.10 | Do. |

* (1) 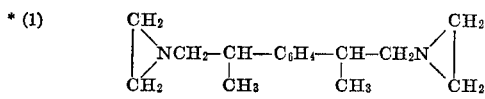

(2) 

(3) 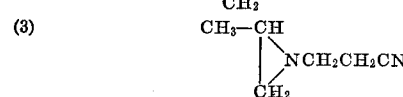

(4) 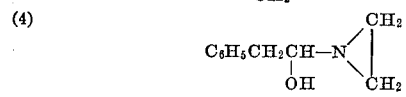

(5) Mixture of $C_2H_5C_6H_4CH_2CH_2N$ 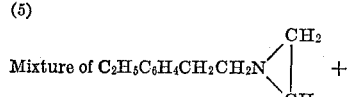 +

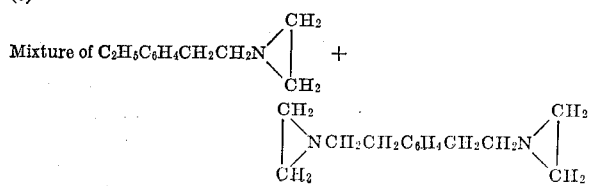

and the "B" samples represent treatments carried out on knitted fabric by padding from the solvent solutions:

| Sample No. | Concentration in $CCl_4$ solution | | Percent N found | Relative dyeability scale [1] | |
| --- | --- | --- | --- | --- | --- |
| | Percent monomer | Percent DES | | Direct dye | Acid dye |
| A1 | 0.5 | 0.17 | 0.42 | 7 | 10 |
| A2 | 1.5 | 0.5 | 0.62 | 9 | 12 |
| A3 | 3.0 | 1.0 | 0.91 | 10 | 13 |
| A4 | 5.0 | 1.7 | 1.00 | 11 | 15 |
| A5 | 10.0 | 3.3 | 1.91 | 12 | [2] 15 |
| B1 | 0.5 | 0.17 | 0.30 | 12 | 12 |
| B2 | 1.5 | 0.5 | 0.44 | 13 | 12 |
| B3 | 3.0 | 1.0 | 1.21 | 15 | 15 |
| B4 | 5.0 | 1.7 | 1.77 | 14 | 14 |
| B5 | 10.0 | 3.3 | 2.59 | 15 | [2] 15 |
| Control A | | | | 0 | 0 |
| Control B | | | | 0 | 0 |

[1] The scale is based on percentage dyeings of the two dyestuffs (direct and acid) made on cotton and woolen fabric. It ranges from 0 to 20 with each increment indicating a comparable increase in shade depth of the dyes as applied to fabrics for which they were intended. A value of 0 on the scale indicates no dyeing and a value of 20 indicates the maximum possible shade depth.
[2] Dull.

EXAMPLE 9

Brominated 100% polypropylene yarn skeins (Br content: 5.45%) were treated with 3% solution in carbon tetrachloride of two aziridines and heated at 200° F. for the time specified in the table and washed thoroughly with water and solvent and dried. The dyeability of the samples was tested with the following acid type dyestuffs:

| Dyestuff name | Color index name |
|---|---|
| Kiton Yellow BR | Acid Yellow 63. |
| Kiton Red A | Acid Red 25. |
| Alizarine Sky Blue FFB | Acid Blue 51. (acid metallized). |
| Permalan Navy Blue RSA | Acid metallized. |

| Sample | Aziridine monomer * | Curing time, minutes |
|---|---|---|
| 1 | I | 0 |
| 2 | I | 5 |
| 3 | I | 25 |
| 4 | I | 50 |
| 5 | II | 0 |
| 6 | II | 5 |
| 7 | II | 25 |
| 8 | II | 50 |

*I 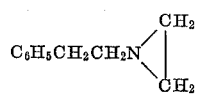

II 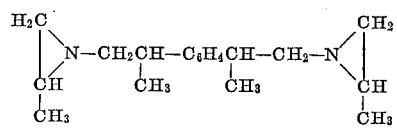

Excellent bright deep shades were obtained.

In the examples set forth above, the amino nitrogen which is permanently locked into the polyolefin by polymerization techniques serves as a dye-receptive site. The extent of the success in introducing such dye-receptive sites is determined by analyzing for the nitrogen content. It is considered that an amino nitrogen content greater than about 0.2% by weight is necessary for satisfactory dyeability. Preferably, about 1% to 2% of amino nitrogen should be introduced, there being no apparent advantage in going substantially above 2%. It is to be appreciated that dye improvement will be noted in polyolefins having less than 0.2% amino nitrogen. Since the number of dye-receptive sites is directly proportional to the number of amino nitrogens present, even a small number of amino nitrogens will provide improvement over a polyolefin in which none are present.

Polymerization catalysts for the aziridine monomers contemplated by the present invention are desirably proton donors. These include inorganic acids and inorganic acid-forming compounds such as sulfuric acid, sulfur dioxide, zinc fluoroborate and phosphoric acid. Also suitable for use are organic acids such as alkylsulfonic acids, arylsulfonic acids, phenols, thiophenols, carboxylic acids, and organic compounds commonly known as alkylating agents, which include, for example, alkylhalides, dialkyl sulfates, alkyltosylates and the like.

Suitable swelling solvents for use in introducing both the catalyst and the monomers are hydrocarbon type solvents such as benzene, toluene, Stoddard solvent, and the like, halogenated hydrocarbons such as chloroform, carbon tetrachloride, perchloroethylene and the like, and ketones such as acetone, methyl ethyl ketone and the like.

Although the examples set forth above call for the use of polymerization catalysts, it is to be appreciated that aziridinyl monomers may also be polymerized by heat alone. The reactivity of the aziridinyl compounds is dependent on structure and the more reactive aziridines can be polymerized, by heating in the absence of catalyst, while the presence of an acidic catalyst is required to obtain the desired degree of polymerization when less reactive monomers are used. Higher temperatures and/or longer reaction times are generally required for the polymerization of the aziridinyl compounds if the catalyst is omitted.

Another class of polymerizable compounds suitable for use in the present invention is represented by the following generic formula:

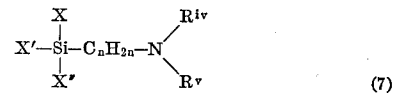

in which X is selected from the group consisting of alkyl radicals having from 1 to about 4 carbon atoms, alkoxy radicals having 1 to 4 carbon atoms, and alkoxyalkyl radicals having from about 3 to 6 carbon atoms; X' and X" are selected from the group consisting of alkoxy radicals having from about 1 to 4 carbon atoms, and alkoxyalkyl radicals having from about 3 to 6 carbon atoms; $n$ is an integer having a value from 1 to about 20; and $R^{iv}$ and $R^v$ are selected from the group consisting of hydrogen, alkyl, and aminoalkyl having from 2 to about 4 carbon atoms and a heterocyclic ring consisting of $R^{iv}$, $R^v$ and nitrogen.

A typical compound of the type shown by generic Formula 7 is set forth below:

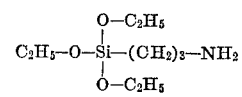 (8)

Compounds of this class, hereinafter called aminosilanes, are introduced into the polyolefin in the manner described above in connection with the aziridine compounds. Polymerization of the aminosilanes is accomplished by subjecting the polyolefin containing the monomer to hydrolyzing conditions, such as by contacting with water or hydrogen ions or both.

Since generic Formula 7 requires that at least two of the three groups connected to the silicon atom be hydrolyzable, it is clear that cross-linked polymers are formed during the polymerization step. A typical reaction product formed from the compound shown in Formula 8 in the presence of moisture is represented by the complex structure indicated below:

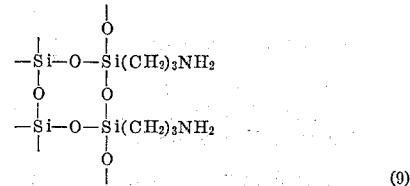

When the process of the present invention is conducted using aminosilane monomers, the polymerization step is desirably conducted by using a polar solvent as the swelling medium since such solvent is compatible with water, for example, which may be used as a polymerization catalyst. Polar solvents such as ketones, dialkyl formamides, dialkyl acetamides, dimethyl disulfide and the like, as well as non-polar solvents such as halogenated solvents can also be used.

Set forth below is an example illustrating the use of aminosilanes in the process of the present invention.

EXAMPLE 10

Samples of polypropylene staple fabric were immersed in 5% solvent solutions of aminofunctional silanes using a weight ratio of fiber to solution of 1 to 25 in each case. The samples were filtered, dried, allowed to stand in a moist atmosphere (65% RH) for several hours, then sewn into bags and tumbled in a home dryer at 140°–150° F. for one hour. The samples were then thoroughly washed and analyzed. The following results were obtained:

| Sample No. | Silane [1] monomer | Solvent | Weight of fiber treated, grams | Percent N |
|---|---|---|---|---|
| 1 | (1) | Dimethyl sulfoxide | 100 | 1.05 |
| 2 | (1) | Perchloroethylene | 100 | 1.85 |
| 3 | (2) | Dimethyl sulfoxide | 100 | 1.54 |
| 4 | (1) | Dimethyl sulfoxide [2] | 75 | 1.03 |
| 5 | (1) | Perchloroethylene | 85 | 1.09 |
| 6 | (2) | Dimethyl sulfoxide [2] | 80 | |
| 7 | (3) | Acetone | 10 | |
| 8 | (4) | ...do | 10 | |
| 9 | (5) | ...do | 10 | |

[1]
(1) $(C_2H_5O)_3Si(CH_2)_3NH_2$
(2) $(CH_3O)_3Si(CH_2)_3NHCH_2CH_2NH_2$
(3) $CH_3-\underset{(OC_2H_5)_2}{Si}-(CH_2)_3N(C_4H_9)_2$
(4) $CH_3-\underset{(OC_2H_5)_2}{Si}-(CH_2)_3N(C_3H_7)_2$
(5)

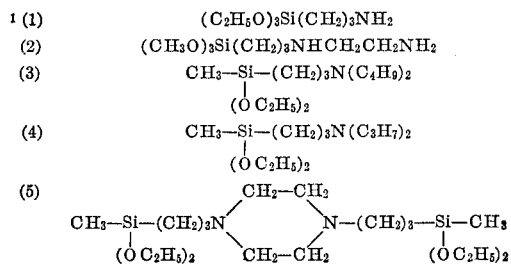

[2] Solution aged 24 hrs.

Yarn was prepared from the treated fibers and was evaluated for dyeability using the following dyestuffs:

| Dyestuff name | Color Index name |
|---|---|
| Levanol Yellow 6G | Acid Yellow 44. |
| Polar Red 3B | Acid Red 134. |
| Chlorantine Fast Blue BLL | Direct Blue 98. |
| Belamine Fast Red | Direct Red 83. |
| Procion Brill. Blue RS | Reactive Blue 4. |
| Procion Brill. Yellow 6GS | Reactive Yellow 1. |
| Capracyl Blue G | Acid Blue 165 (neutral metallized). |
| Palatine Fast Orange R | Acid Orange 76 (acid metallized). |
| Ponsol Jade Green Supra Double Powder | Vat Green 1. |
| Eastman Yellow 4R | Dispersed Yellow 23. |

All treated samples exhibited greatly improved dyeability with acid dyestuffs, direct dyestuffs and fiber reactive dyestuffs. Wash and dry cleaning fastness properties were good; light fastness was good with acid dyestuffs but poor with reactive dyes.

The present invention also contemplates the use of comonomer systems in which two monomers are chosen from different classes of compounds. In such embodiment, a copolymer is formed within the polyolefin.

One typical system of this type involves the use of a monomer containing at least one amino nitrogen in combination with a monomer containing at least one epoxy radical. this type of reaction is complex and the reaction product cannot accurately be represented by formula. Thus, for example, an aminosilane monomer of the type defined by generic Formula 7 can be used in combination with a monomeric epoxy compound such as an epihalohydrin, bis-glycidyl ether, butadiene diepoxide to provide an insoluble copolymer within the polyolefin being treated.

The aziridine compound represented by generic Formulas 3 and 4 can also be used in combination with monomeric compounds containing at least one epoxy radical in accordance with the present invention.

The mechanism of the polymerization reaction between amino nitrogens and epoxy radicals may also be utilized to form polymers in situ in accordance with the present invention by use of a polyamino monomeric compound, i.e., a compound containing a plurality of amino nitrogens and a polyepoxy compound, i.e., a compound containing a plurality of epoxy radicals. Typical polyamino compounds suitable for use are polyether diamines such as:

$$H_2NC_3H_6(OC_3H_6)_nNH_2 \qquad (10)$$

and $$H_2NC_2H_4(OC_2H_4)_nNH_2 \qquad (11)$$

where $n$ has a value of 2 to 20.

Polyepoxy compounds suitable for such use are polyglycidyl ethers of glycols and polyols, bis-glycidyl ethers of polyhydric phenols, vinyl cyclohexene dioxide, butadiene diepoxide and the like.

An advantage of using combinations of copolymers which are selected from different groups is that the need of a catalyst to initiate or maintain the polymerization reaction may be avoided. Generally, it is necessary only to subject the polyolefin containing the combination of monomers to an elevated temperature.

Set forth below are typical examples showing the use of combinations of comonomers in the process of the present invention.

EXAMPLE 11

Samples of polypropylene staple fiber were treated by immersing them in acetone solutions containing a 1:2 ratio of epoxide compound to amino compound, the total monomer concentration in the solution being 5%. After the treatment, the samples were filtered, dried, tumbled to cure at 200° F., and washed. Nitrogen analysis and dyeability data were obtained directly on the treated fiber. The dyestuffs used were as follows:

| Dyestuff name | Color Index name |
|---|---|
| Levanol Yellow 6G | Acid Yellow 44. |
| Capracyl Red B | Acid Red 182 (neutral metallized). |
| Palatine Fast Orange | Acid Orange 76 (acid metallized). |
| Chlorantine Fast Blue BLL | Direct Blue 98. |

| Sample No. | Epoxy [1] compound | Amino [2] compound | Percent N | Dyeability Acid dyes | Dyeability Direct dyes |
|---|---|---|---|---|---|
| 1 | (A) | (1) | 0.40 | Good | Good. |
| 2 | (A) | (2) | 0.68 | ...do | Do. |
| 3 | (A) | (3) | 0.58 | ...do | Do. |
| 4 | (A) | (4) | 0.96 | Excellent | Excellent. |
| 5 | (B) | (2) | 0.85 | ...do | Do. |

[1] (A)=Resorcinol diglycidyl ether; (B)=Epichlorohydrin.
[2] (1)=Aminopropyl triethoxy silane; (2)=Aminoethylaminopropyl trimethoxy silane; (3)=Polyether diamine L-2000 (Union Carbide); (4)=Polyether diamine L-1000 (Union Carbide).

EXAMPLE 12

Samples of polypropylene staple fiber were treated by the procedure outlined in Example 11, using acetone solutions containing aminoethyl-aminopropyl trimethoxy silane and an epoxy compound. The total monomer concentration was 5%, and the ratio of amine to epoxy is indicated as shown in the table. The results obtained using the dyestuffs of Example 8 are summarized in the table below:

| Sample No. | Epoxide [1] | Ratio epoxide to amine (weight) | Percent N | Relative dyeability rank | |
|---|---|---|---|---|---|
| | | | | Direct dyes | Acid dyes |
| 1 | (A) | 1/1 | 0.41 | 11 | 11 |
| 2 | (A) | 2/1 | 0.44 | 8 | 9 |
| 3 | (A) | 1/2 | 0.44 | 10 | 9 |
| 4 | (A) | 1/3 | 0.38 | 10 | 10 |
| 5 | (A) | 3/1 | 0.41 | 8 | 8 |
| 6 | (B) | 1/1 | 0.4 | 10 | 8 |
| 7 | (B) | 2/1 | 0.49 | 10 | 8 |
| 8 | (B) | 1/2 | 0.92 | 10 | 8 |
| 9 | (B) | 1/3 | 0.91 | 8 | 10 |
| 10 | (B) | 3/1 | 0.57 | 8 | 4 |
| Control 1 | Epoxide only | | | 0 | 0 |
| Control 2 | Amine only | | | 0 | 0 |

[1] (A)=Resorcinol diglycidyl ether; (B)=Epichlorohydrin.

In addition to the systems set forth above, other monomers and monomer combinations can be employed to attain the desirable objectives of the present invention. It is necessary that at least one of the monomers, if more than one is used, include a dye-receptive site. Accordingly, such systems as dialkylamino alkyl acrylates and N, N'dialkyl acrylamides and the like are suitable. It is equally important that the polymerization proceed at a desirable rate and in this respect, monomers capable of polymerization by ring opening reactions such as aziridinyl and epoxy compounds are preferred over the monomers which react according to a vinyl type of polymerization which is generally slower.

Preferably, the monomers used in accordance with the present invention should have a molecular weight no greater than about 600. The importance of molecular weight is that the introduction of the monomers into the polyolefin depends upon diffusion mechanisms and it is well known that the rate of diffusion decreases with increasing molecular weight.

It is to be appreciated that the success of the process of this invention depends heavily on the transport of the monomer into the interior of the polyolefins being treated. In the examples set forth above, this is accomplished by treating the polyolefin with a solvent capable of swelling it. Alternatively, diffusion of the monomer into the polyolefin may be accomplished by transforming the monomer into the vapor or gaseous state and contacting it with the polyolefin in a vapor phase reaction.

The reactivity of the monomer or monomer systems is an important factor in selecting reaction conditions for the various steps of the process. Thus, for example, the conditions during the step of introducing the monomer into the polyolefin should be selected to ensure that no premature polymerization will occur, either in the solution or on the surface of the polyolefin. In this respect, an ideal monomer system is one which is substantially unreactive below a given temperature or in the absence of a catalyst but which has a relatively high rate of reaction above such temperature or in the presence of a catalyst.

The concentration of the monomer or monomers in the solvent during the step of introducing them into the polyolefin is not critical and can be varied over a broad range. Concentrations between .5% and 10% by weight have been found to be satisfactory. Concentrations above 10% tend to produce undesirable polymerization on the surface of the polyolefin and are to be avoided, if possible. However, it is to be appreciated that the selection of the concentration is based in part on the reactivity and diffusivity of the monomer or comonomer system and high concentrations may be tolerated without disadvantage, in certain situations. When applying the monomer or comonomer from the vapor phase, the concentration is much less important, the amount of monomer being introduced being generally controlled by the vapor pressure, temperature and contact time.

The polymerization step is preferably initiated by the use of elevated temperatures since this accelerates both the diffusion of the monomer into the polyolefin and also the rate of polymerization reaction. Care must be taken not to exceed the softening point of the polyolefin material being treated. Thus, for example, in the treatment of heat sensitive polyolefin fibers such as polypropylene, temperatures of the order of 150° to 200° F. are preferred.

The time during which the polyolefin is subjected to the elevated temperature depends upon the monomer system being used, the catalyst and on the catalyst concentration. Preferably, reaction conditions should be selected so that a heating time of from 10 to 60 minutes is sufficient. However, this is a practical consideration and longer or shorter heating times can be used.

Following the polymerization step, it is generally desirable to wash the treated polyolefin to remove unreacted monomer, catalyst and polymer which may be adhering to the surface.

Polyolefin fibers treated according to the process of this invention exhibit good to excellent dyeability with acid, acid metallized, direct and reactive dyes and improved dyeability with other classes of dyes over untreated controls. The color fastness of the dyeings to washings, dry cleaning and light is good and depends on the specific dye used.

Preferably, the polyolefins which are treated with the process of the present invention should have a high rate of surface area to cross-sectional area. This permits a large amount of monomer to be diffused into the polyolefin. Textile fibers formed of polyolefins are ideally suited for treatment in accordance with the present invention. Fibers formed from melt blends of polyolefins with other polymers are also amenable to the process of the present invention. The process is applicable to the treatment of staple fibers, filament yarns and fabrics produced therefrom.

It is to be appreciated that blends of polyolefin fibers with other types of fibers may also be treated. Also materials, fabrics, yarns and the like which are fabricated with polyolefin fibers can be processed to obtain the advantages of the present process.

The term "polyolefin" as it is used herein, is intended to denote polymers of olefins, particularly α-olefins and especially α-olefins of 2 to 4 carbon atoms, having an inherent viscosity between about 1.2 and 10.0. Included within this definition are the fiber-forming homopolymers of α-olefins, typically ethylene and propylene, and the fiber-forming copolymers of olefins with other copolymerizable materials composed of at least 85% by weight of olefin units.

It is to be appreciated that the various examples set forth above are intended as merely illustrative of the present invention and variations may be made by one skilled in the art without departing from the spirit and scope of the invention.

What is claimed is:

1. A method of improving the dyeability of a polymer fiber whose polymer consists essentially of a homopolymer of an α-olefin having from 2 to 4 carbons by incorporating therein an insoluble polymer of at least one polymerizable monomer having a molecular weight of no greater than about 600 containing at least one aziridinyl radical selected from the group consisting of bis-aziridinyl monomers of the formula:

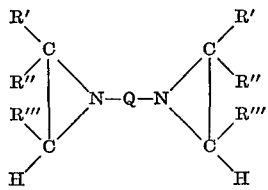

and mono-aziridinyl monomers of the formula

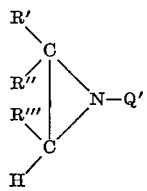

wherein R', R", and R''' are hydrogen or lower alkyl of from 1 to 4 carbon atoms, Q is a divalent hydrocarbon radical having no non-hydrocarbon substituents other than hydroxyl, cyano and carbonyloxy groups; and Q' is a monovalent hydrocarbon radical having no substituents other than hydroxyl, cyano and carbonyloxy, said process comprising the steps of introducing said monomer into said fiber and then subjecting the fiber to reaction conditions to polymerize and insolubilize said monomer within said fiber.

2. A method of improving the dyeability of a polymer fiber whose polymer consists essentially of a homopolymer of an α-olefin having from 2 to 4 carbons by incorporating therein an insoluble polymer of at least one mono-aziridinyl polymerizable monomer having a molecular weight of no greater than about 600 and represented by the formula:

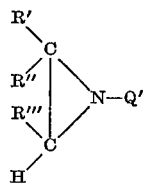

wherein each R', R", and R''' is hydrogen or lower alkyl of 1 to 4 carbon atoms and Q' is a monovalent hydrocarbon radical having no substituents other than hydroxyl, cyano and carbonyloxy, said process comprising the steps of introducing said monomer into said fibers and then subjecting the fiber to reaction conditions to polymerize and insolubilize said monomer within said fiber.

3. A method according to claim 2 wherein said monomer is of the formula:

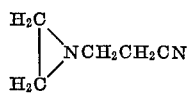

4. A method according to claim 2 wherein said monomer is of the formula:

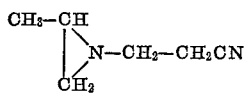

5. A method according to claim 2 wherein said monomer is of the formula:

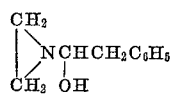

6. A method according to claim 2 wherein said monomer is of the formula:

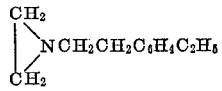

7. A method according to claim 2 wherein said monomer is of the formula:

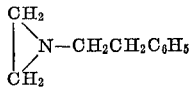

8. A method of improving the dyeability of a polymer fiber whose polymer consists essentially of a homopolymer of an α-olefin having from 2 to 4 carbons incorporating therein an insoluble polymer of at least one bis-aziridinyl polymerizable monomer having a molecular weight of no greater than about 600 and represented by the formula:

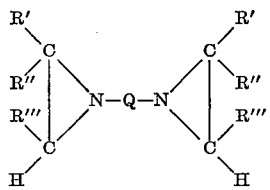

wherein R', R" and R''' are hydrogen or alkyl of 1 to 4 carbon atoms and Q is a divalent hydrocarbon radical having no substitutents other than hydroxyl, cyano and carbonyloxy, said process comprising the steps of introducing said monomer into said fibers and then subjecting the fiber to reaction conditions to polymerize and insolubilize said monomer within said fiber.

9. A method according to claim 8 wherein said bis-aziridinyl monomer is of the formula:

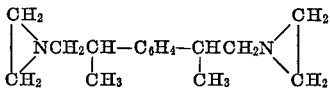

10. A method according to claim 8 wherein said bis-aziridinyl monomer is of the formula:

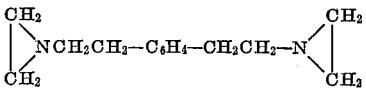

11. A method according to claim 8 wherein said bis-aziridinyl monomer is of the formula:

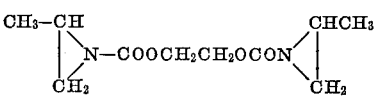

12. A method according to claim 8 wherein said bis-aziridinyl monomer is of the formula:

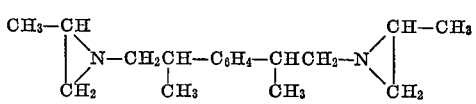

13. A method of improving the dyeability of a polymer fiber whose polymer consists essentially of a homopolymer of an α-olefin having from 2 to 4 carbons by incorporating therein an insoluble polymer of at least one polymerizable monomer selected from the group consisting of

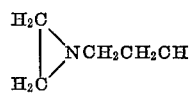

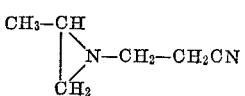

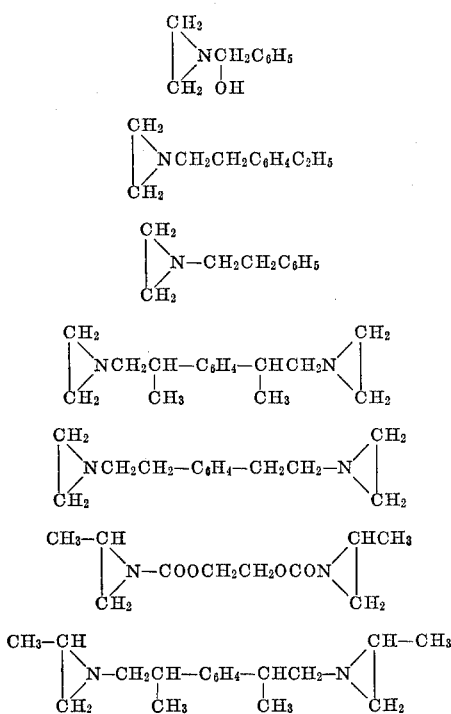

comprising the steps of introducing said monomer into said fiber and then subjecting the fiber to reaction conditions to polymerize and insolubilize said monomer within said fiber.

14. The method comprising the steps of providing polyolefin fibers whose polymer consists essentially of a homopolymer of an α-olefin having from 2 to 4 carbons incorporating amino-reactive radicals selected from the group consisting of halogen radicals, sulfonyl radicals and phosphonyl radicals which are chemically bonded to the structure of the polyolefin; introducing into the polyolefin fibers a polymerizable monomer having a molecular weight of no greater than about 600 and containing at least one amino nitrogen; and subjecting the fibers to reaction conditions to polymerize and insolubilize said monomer within the polyolefin fibers.

15. A method of treating polyolefin fibers whose polymer consists essentially of a homopolymer of an α-olefin having from 2 to 4 carbons comprising the steps of introducing at least one monomer having a molecular weight of no greater than about 600 and containing at least one dye-receptive site into said polyolefin fibers and subjecting said fibers to reaction conditions to form within said fibers an insoluble polymer comprising repeating groups formed from said monomer.

16. A method of treating polyolefin fibers whose polymer consists essentially of a homopolymer of an α-olefin having from 2 to 4 carbons to impart improved dyeability by polymerizing a monomer having a molecular weight of no greater than about 600 and containing at least one dye-receptive site within said fibers comprising the steps of introducing into said polyolefin fibers a polymerization catalyst for said monomer; introducing into the polyolefin fibers said monomer containing at least one dye-receptive site and heating said fibers to polymerize and insolubilize the monomer within the fibers.

17. A method of treating polyolefin fibers whose polymer consists essentially of a homopolymer of an α-olefin having from 2 to 4 carbons to impart improved dyeability by polymerizing a monomer having a molecular weight of no greater than about 600 and containing at least one dye-receptive site within said fibers comprising the steps of introducing into the polyolefin fibers said monomer containing at least one dye-receptive site, introducing into the fibers a polymerization catalyst for said monomer; and heating said fibers to polymerize and insolubilize the monomer within the fibers.

18. A method of treating polyolefin fibers whose polymer consists essentially of a homopolymer of an α-olefin having from 2 to 4 carbons to impart improved dyeability by polymerizing a monomer having a molecular weight of no greater than about 600 and containing at least one dye-receptive site within said fibers comprising the steps of simultaneously introducing into said fibers (1) said monomer containing at least one dye-receptive site and (2) a polymerization catalyst for said monomer; and heating said fibers to polymerize and insolubilize the monomer within the fibers.

19. A method of treating polyolefin fibers whose polymer consists essentially of a homopolymer of an α-olefin having from 2 to 4 carbons comprising the steps of introducing within the fibers (1) a monomer having a molecular weight of no greater than about 600 and containing at least one dye-receptive site and (2) a second monomer capable of polymerizing to form a copolymer with said first named monomer; and heating the fibers to copolymerize and insolubilize the monomers within the fibers.

References Cited
UNITED STATES PATENTS

| | | |
|---|---|---|
| 3,205,156 | 9/1965 | Atarashi et al. |
| 3,321,267 | 5/1967 | Bonvicini et al. _____ 8—100 |
| 3,399,251 | 8/1968 | Miller et al. _____ 260—897 |

MAYER WEINBLATT, Primary Examiner

U.S. Cl. X.R.

8—55, 100; 117—139.5; 260—897

UNITED STATES PATENT OFFICE
CERTIFICATE OF CORRECTION

Patent No. 3,542,502  Dated November 24, 1970

Inventor(s) Giuliana C. Tesoro

It is certified that error appears in the above-identified paten and that said Letters Patent are hereby corrected as shown below:

Column 6, line 72, "Excellent" should read -- Fair --; lir "Fair" should read -- Poor --; line 75, "Poor" should read -- Excellent --.
Column 11, line 72, "this" should read -- This --.
Column 16, lines 67-70, the right-hand portion of the forr should read -- $CH_2CN$ --.

Signed and sealed this 28th day of September 1971.

(SEAL)
Attest:

EDWARD M. FLETCHER, JR.
Attesting Officer

ROBERT GOTTSCHALK
Acting Commissioner of F

UNITED STATES PATENT OFFICE
CERTIFICATE OF CORRECTION

Patent No. 3,542,502      Dated November 24, 1970

Inventor(s) Giuliana C. Tesoro

It is certified that error appears in the above-identified patent and that said Letters Patent are hereby corrected as shown below:

Column 17, lines 1-4, the formula should read

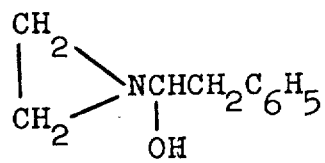

Signed and sealed this 14th day of December 1971.

(SEAL)
Attest:

EDWARD M. FLETCHER, JR.
Attesting Officer

ROBERT GOTTSCHALK
Acting Commissioner of Patents

UNITED STATES PATENT OFFICE
CERTIFICATE OF CORRECTION

Patent No. 3,542,502  Dated November 24, 1970

Inventor(s) Giuliana C. Tesoro

It is certified that error appears in the above-identified patent and that said Letters Patent are hereby corrected as shown below:

Claim 13, column 17, line 1, the formula should read:

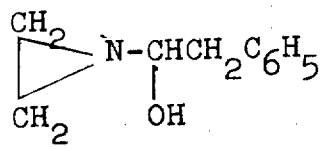

Signed and sealed this 22nd day of February 1972.

(SEAL)
Attest:

EDWARD M. FLETCHER, JR.
Attesting Officer

ROBERT GOTTSCHALK
Commissioner of Patents